United States Patent Office 3,848,052
Patented Nov. 12, 1974

3,848,052
PROCESS FOR THE PREPARATION OF
STANNIC CHLORIDE
Elbert M. De Forest, Wichita, Kans., and Lewis A. St. Cyr, Thornton, and Loren H. Young, Northglenn, Colo., assignors to Vulcan Materials Company, Birmingham, Ala.
No Drawing. Filed May 17, 1973, Ser. No. 361,341
Int. Cl. C01g 19/08
U.S. Cl. 423—96       4 Claims

ABSTRACT OF THE DISCLOSURE

Stannic chloride of high purity is prepared by the chlorination of tin above its melting point while controlling the reaction temperature by introducing liquid stannic chloride into the molten tin body simultaneously with the chlorine. The liquid stannic chloride, which has a boiling point well below the melting point of tin, is introduced into the molten tin at a rate and in an amount sufficient to absorb excess heat of reaction by becoming heated and vaporized, thereby maintaining the molten tin at a preselected, substantially steady reaction temperature and avoiding formation of hot spots.

BACKGROUND OF THE INVENTION

The present invention is concerned with a novel method for the preparation of stannic chloride by the direct chlorination of molten tin metal.

It is known to prepare stannic chloride by contacting molten metallic tin with chlorine gas. The melting point of pure tin is about 235° C., and the chlorination is usually performed at a slightly higher temperature. By control of the flow of chlorine gas, the reaction may be so regulated that the chlorination product is predominantly stannic chloride, which boils at about 114° C. and can therefore be conveniently withdrawn as a vapor. A supernatant layer of stannous chloride, which melts at about 247° C., is formed at the same time. A process of this type is described by W. S. Smith in U.S. Pat. 1,777,132.

The reaction between molten tin and chlorine is strongly exothermic, there being liberated 122 kg. cal. of heat per mole (or 896 B.t.u. per pound) of stannic chloride formed. Owing to the surprising slow rate of transmission of heat throughout molten tin, the removal of this generated heat so as to maintain an acceptable uniform operating temperature during the chlorination. presents a difficult problem for which no fully satisfactory solution has thus far been available. This inability of the molten tin to conduct heat can result in a very high localized temperature particularly at the point of injection of the chlorine, resulting in "hot spots" which may reach the point of red heat. If an attempt is made to employ cooling surfaces to which the heat can eventually travel and be transferred, it is found that this expedient results in a very high temperature difference between the point of chlorine injection and the heat transfer surface, which is a very undesirable condition within the reaction system as a whole.

It has been proposed in the prior art to manufacture anhydrous stannic chloride by immersing solid metallic tin in a liquid stannic chloride medium saturated with chlorine gas, whereby the chlorine dissolved in the liquid reacts to form stannic chloride. This method was found to be commercially impracticable, because the stannic chloride will dissolve only a comparatively small quantity of chlorine, and moreover, the solubility decreases rapidly with increase of temperature of the liquid, with resulting hazardous increase in pressure within the system. In order to overcome this problem, it was proposed by Buttfield in U.S. Pat. 1,897,360 to conduct the operation in liquid phase below the melting point of the tin (235° C.), using as the reaction medium a liquid having a boiling temperature below that of tin, such as $SnCl_4$ or $CCl_4$. When $SnCl_4$ was to be employed as the liquid reaction medium in such a system, the reaction temperature necessarily had to be kept relatively low to prevent boiling, e.g., below 114° C. at atmospheric pressure. Because this prior art process involved the use of solid, and not molten tin, and a relatively low reaction temperature, it was inherently relatively inefficient. In U.S. Pat. 2,061,816 (Tyson) which relates to a method in which block tin is first contacted with chlorine gas essentially below the melting point of the tin, the local overheating of the solid tin and its resulting partial melting is controlled by limiting the flow of chlorine, the molten portion of the tin being allowed to collect and solidify in an underlying body of liquid stannic chloride, the chlorinator being equipped with a reflux condenser which returns the stannic chloride to the reaction zone such that actually only a minor proportion of the tin is in molten form and that only temporarily. Again, the process is relatively inefficient because of the use of solid tin, the inefficiency of contact between the solid tin and gaseous chlorine, and the low reaction temperature. In U.S. Pat. 882,354 (Sperry) the problem of heat control in the chlorination of solid tin is handled by conducting the operation in jacketed vessels using a liquid cooling medium for indirect heat transfer, and by maintaining the temperature of the reacting mass low enough such that the stannic chloride formed remains liquid and is removed from the system in liquid form. However, the relatively low reaction temperature required and the extremely slow rate of heat transfer through the system makes this inefficient also. Finally, in U.S. Pat. 2,385,505, it was proposed by Grimble that in carrying out reactions between a solid metal such as aluminum below its melting point and a halogen gas to give a metallic halide vapor, the temperature of the reaction which may give rise to hot spots may be controlled by utilizing the prevaporized metal halide in admixture with the halogen reactant gas as a heat absorbing means to remove excess heat from the reaction zone, the metal halide vapor required for this purpose being obtained by vaporizing a portion of the total metal halide produced and mixing it with the halogen gas before introduction into the reaction zone. The latent heat of vaporization of the metal halide is not utilized in removing excess heat from the reaction zone.

None of these prior art processes and techniques has been concerned specifically with the removal of excess heat generated in the chlorination of molten tin, and the expedients previously employed have proved ineffective to control excess heat in the present type of stannic chloride manufacture.

GENERAL DESCRIPTION OF THE INVENTION

In accordance with the present invention, there is provided a novel process for the manufacture of stannic chloride by the direct chlorination of a mass of molten tin, in which excess heat generated by the reaction is controlled by the simultaneous subsurface introduction of liquid stannic chloride into the molten tin mass.

Accordingly, the process of the invention comprises the steps of providing a body of molten tin metal in a reaction zone, introducing chlorine gas into the molten tin body below its surface, and simultaneously introducing into the molten tin body below its surface and in close proximity to the chlorine feed an amount of liquid stannic chloride sufficient to control the heat of reaction.

This control is achieved by heating and vaporization of the furnished stannic chloride, the sensible heat and the latent heat of vaporization absorbed by the stannic chloride as it is heated and vaporized serving to produce a substantially constant temperature in the molten body of tin and to minimize the formation of hot spots.

The stannic chloride formed and vaporized in the reaction zone is removed in vapor form and the stannic chloride vapors are condensed and collected as a liquid outside the reaction zone. Reflux of the stannic chloride vapors directly back onto the molten tin body within the reaction zone is preferably not employed because it tends to cause undesirable solidification of the molten layer of stannous chloride which inherently forms to a greater or lesser extent in the reaction and floats on the molten tin surface. A suitable proportion of the condensed liquid stannic chloride is recycled to the reaction zone in liquid form and introduced into the molten tin body below its surface to furnish the requisite quantity of heat control materials.

In carrying out the process of the invention, the body of molten tin is maintained at a temperature between about 235° C., i.e., the melting point of tin, and about 350° C. or higher, preferably above the melting point of stannous chloride (247° C.) and below about 300° C., and most preferably between about 250° and about 280° C., e.g., at about 260° C. Conducting the reaction at a tin bath temperature higher than 350° C. is practical, but reaction temperatures lower than 300° C. have a certain advantage in minimizing volatilization of the supernatant stannous chloride layer. Reaction temperatures above 247° C. have the advantage of avoiding solidification of the stannous chloride layer.

The reaction of chlorine with tin to form stannic chloride liberates 122 kg. cal. of heat per mole of $SnCl_4$ formed. In accordance with the invention, liquid stannic chloride is injected into the reaction zone below the surface of the molten tin, preferably in the immediate vicinity of or in admixture with the chlorine feed being introduced, in order to remove this heat of reaction. When the stannic chloride is introduced into the reaction zone at room temperature, the total heat removed per mole of $SnCl_4$ input is 15.3 kg. cal., which is the sum of the calories needed to heat the liquid $SnCl_4$ from 25° C. to 114° C. and vaporize it, and then to heat the $SnCl_4$ vapors to the temperature of the molten tin body (260° C.). Accordingly, the liquid stannic chloride injected for heat control purposes is advantageously supplied at a rate approximately 7 times the rate of production of fresh stannic chloride as the result of the chlorination. In this way the temperature of the tin body will be maintained at the preferred level of about 260° C. It will be understood, however, that the rate at which control quantities of stannic chloride liquid are supplied to the system will vary according to the tin body temperature, the temperatures of the chlorine feed and of the recycled stannic chloride, heat losses from the system, and so on.

The chlorine required for the chlorination reaction is injected into the body of molten tin below its surface. The body of metal is maintained in a suitable reaction vessel, e.g., an enclosed ferrous metal reactor. No heating means are required, except that the initial charge of tin is preferably melted by some extraneous means. The chlorine is supplied at a rate which will essentially completely react with the tin at the selected reaction temperature.

The chlorine gas and the coolant portion of liquid stannic chloride may be injected into the molten tin body at different points, or preferably in the same general region, or most preferably at substantially the same point, e.g., by means of concentric coaxial tubes or closely adjacent or converging tubes.

The excess heat produced by the reaction is absorbed by vaporization of the liquid stannic chloride, which together with freshly produced stannic chloride reaction product passes out of the reaction vessel and the combined vapors are then condensed. As stated before, the liquid condensate is preferably not permitted to reflux back into the molten tin surface, but the quantity of the condensate which is required for heat control purposes is recycled to the reaction zone and introduced into the molten tin body below the supernatant stannous chloride layer simultaneously with the chlorine gas.

DESCRIPTION OF THE PREFERRED EMBODIMENT

The following example serves to illustrate the practice of the invention, but is not to be regarded as limiting.

Example

A charge comprising about 8 kilograms of commercial tin metal (Straits grade) is melted and placed in a steel reactor provided with inlets for the continuous introduction of molten tin, chlorine gas, and liquid stannic chloride, External heating means, such as a gas burner, may be used to melt the tin and bring it to the selected operating temperature. There is thus formed a body of molten tin maintained at about 260° C. An internal thermocouple located in a well is used to monitor the tin metal temperature. Chlorine gas in injected through the inner tube of a pair of concentric tubes about 3 centimeters beneath the surface of the molten body, at a pressure of 10 p.s.i.g. (about 1.7 atmospheres), and at a rate of 1.0 liters per minute at 25° C. The rate of chlorine flow is adjusted, together with the rate of liquid stannic chloride input, so that the melt temperature remains essentially constant. A coat of stannous chloride forms on the tin surface and remains in place. Stannic chloride in liquid form at 25° C. is passed from a storage and introduced below the surface of the molten tin through the outer tube of the pair of inlet tubes at a rate of about 16 ml. per minute, and extraneous heating is gradually shut off so as to maintain the reaction zone temperature at about 260° C. The stannic chloride is injected directly into the molten tin using a peristaltic pump thus providing accurate flow control. The estimated rate of heat removal by the liquid $SnCl_4$ coolant is 2.13 kg. cal. per minute.

The stannic chloride vapors pass from the reaction vessel to a condenser and are condensed and recovered in a storage tank. A portion of the stannic chloride is returned to the reaction zone via the peristaltic pump. The remaining stannic chloride product is treated with charcoal or with mossy tin to remove dissolved chlorine, and is of a high degree of purity.

What is claimed is:

1. Process for the preparation of stannic chloride by chlorination of tin metal, comprising the steps of:
   (a) providing a body of molten tin in a reaction zone;
   (b) introducing chlorine gas into said molten tin body to react with the tin to form stannic chloride;
   (c) maintaining the molten tin at a substantially steady temperature which is above the boiling point of stannic chloride and between about 235° and about 350° C. by introducing liquid stannic chloride into said molten tin body simultaneously with and substantially at the same point as the chlorine gas at a rate and in an amount sufficient to absorb excess heat of reaction by the stannic chloride becoming heated and vaporized;
   (d) recovering stannic chloride vapor; and
   (e) condensing the vapor to produce liquid stannic chloride.

2. The process of Claim 1 in which a portion of the liquid stannic chloride is recycled to the reaction zone for temperature control therein.

3. The process of Claim 1 in which the temperature of the body of molten tin is above the melting point of stannous chloride and below about 300° C.

4. A process according to Claim 1 wherein the temperature of the molten tin is maintained above 247° and below 280° C., the stannic chloride vapor produced therein is withdrawn from the reaction zone and passed to a separate cooling zone within it is condensed to form liquid stannic chloride, and a portion of this liquid stannic chloride is recycled to the reaction zone to be injected as a coolant into the body of molten tin below the surface thereof.

References Cited
UNITED STATES PATENTS

| | | | |
|---|---|---|---|
| 810,454 | 1/1906 | Acker | 423—494 |
| 872,205 | 11/1907 | Sperry | 423—494 X |
| 877,247 | 1/1908 | Sperry | 423—494 X |
| 1,897,360 | 2/1933 | Buttfield | 423—494 |
| 1,999,179 | 4/1935 | Burgess | 423—494 |
| 2,061,816 | 11/1936 | Tyson | 423—494 |
| 3,161,465 | 12/1964 | Horn et al. | 423—494 X |

EDWARD STERN, Primary Examiner

U.S. Cl. X.R.

423—494

UNITED STATES PATENT OFFICE
CERTIFICATE OF CORRECTION

Patent No. 3,848,052         Dated November 12, 1974

Inventor(s) Elbert M. DeForest, Lewis A. St.Cyr & Loren H. Young

It is certified that error appears in the above-identified patent and that said Letters Patent are hereby corrected as shown below:

Column 5, line 3, change "within" to read -- where --.

Signed and sealed this 21st day of January 1975.

(SEAL)
Attest:

McCOY M. GIBSON JR.
Attesting Officer

C. MARSHALL DANN
Commissioner of Patents